United States Patent
Zhang et al.

(10) Patent No.: US 8,676,124 B2
(45) Date of Patent: Mar. 18, 2014

(54) SCHEDULING BASED ON EFFECTIVE TARGET LOAD WITH INTERFERENCE CANCELLATION IN A WIRELESS COMMUNICATION SYSTEM

(75) Inventors: Danlu Zhang, San Diego, CA (US); Bibhu Mohanty, San Diego, CA (US); Sharad Deepak Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 626 days.

(21) Appl. No.: 12/238,067

(22) Filed: Sep. 25, 2008

(65) Prior Publication Data

US 2009/0088080 A1 Apr. 2, 2009

Related U.S. Application Data

(60) Provisional application No. 60/975,853, filed on Sep. 28, 2007.

(51) Int. Cl.
*H04B 1/00* (2006.01)
*H04B 15/00* (2006.01)
*H04B 17/00* (2006.01)

(52) U.S. Cl.
USPC ........................................ 455/63.1; 455/67.11

(58) Field of Classification Search
USPC ............ 455/63.1, 67.11, 67.13, 67.16, 115.1, 455/226.1, 226.3, 278.1, 296, 114.2
See application file for complete search history.

(56) References Cited

U.S. PATENT DOCUMENTS

| | | | |
|---|---|---|---|
| 6,131,015 A * | 10/2000 | Hill et al. | 455/69 |
| 6,961,362 B2 | 11/2005 | Ariyoshi et al. | |
| 7,123,676 B2 * | 10/2006 | Gebara et al. | 375/364 |
| 7,133,437 B2 | 11/2006 | Black et al. | |
| 7,190,749 B2 | 3/2007 | Levin et al. | |
| 7,215,653 B2 | 5/2007 | Kim et al. | |

(Continued)

FOREIGN PATENT DOCUMENTS

CN 1986342 A 6/2007
EP 1708536 A2 10/2006

(Continued)

OTHER PUBLICATIONS

International Search Report—PCT/US2006/012841, International Search Authority—European Patent Office—Sep. 5, 2006.

(Continued)

*Primary Examiner* — Eugene Yun
(74) *Attorney, Agent, or Firm* — Darren M. Simon

(57) ABSTRACT

Techniques for scheduling users for transmission on the uplink in a wireless communication system are described. A cell may perform interference cancellation for uplink transmissions and may observe lower effective noise and interference due to interference cancellation. The lower effective noise and interference may allow the cell to operate with a higher effective target load, which may support a higher overall throughput for the cell. In one design, an effective target load for a cell using interference cancellation may be determined, e.g., based on a target rise-over-thermal (RoT) for the cell and an interference cancellation efficiency factor. An available load for the cell may be determined based on the effective target load, which may be higher than a target load for the cell without interference cancellation. Users in the cell may then be scheduled for transmission on the uplink based on the available load.

37 Claims, 8 Drawing Sheets

(56) References Cited

U.S. PATENT DOCUMENTS

| | | | |
|---|---|---|---|
| 7,295,636 | B2 | 11/2007 | Onggosanusi et al. |
| 7,324,821 | B2 | 1/2008 | Kwak et al. |
| 7,373,163 | B2 | 5/2008 | Kim et al. |
| 7,412,254 | B2 * | 8/2008 | Senarath et al. ............ 455/522 |
| 7,680,176 | B2 * | 3/2010 | Lindoff et al. ............... 375/148 |
| 2004/0228349 | A1 | 11/2004 | Vrzic et al. |
| 2005/0013350 | A1 | 1/2005 | Coralli et al. |
| 2007/0105583 | A1 | 5/2007 | Gerlach |

FOREIGN PATENT DOCUMENTS

| | | |
|---|---|---|
| JP | 2001024554 A | 1/2001 |
| JP | 2002044017 A | 2/2002 |
| JP | 2007129708 A | 5/2007 |
| RU | 2280335 C2 | 7/2006 |
| RU | 2284675 C2 | 9/2006 |
| WO | WO02082581 A2 | 10/2002 |
| WO | WO02096146 | 11/2002 |
| WO | 2004045239 | 5/2004 |
| WO | WO2004075468 | 9/2004 |
| WO | WO2007026054 | 3/2007 |

OTHER PUBLICATIONS

International Preliminary Report on Patentability—PCT/US2006/012841, International Search Authority—The International Bureau of WIPO—Oct. 9, 2007.

Written Opinion—PCT/US2006/012841, International Search Authority—European Patent Office—Sep. 5, 2006.

cdma2000 "High Rate Packet Data Air Interface Specification" 3GPP2 C.S0024-A. v.1, Mar. 2004.

TIA/EIA-95-B, "Mobile Station-Base Station Compatibility Standard for Wideband Spread Spectrum Cellular Systems", Mar. 3, 1999.

International Search Report & Written Opinion—PCT/US2008/077981, International Search Authority—European Patent Office—Feb. 24, 2009.

Overload Indicator Command Triggering 3GPP TSG-RAN WG2 #45 BIS, XX, XX, R2-050172, Jan. 10, 2005, pp. 1-4, XP002370693.

EE624 Mobile Communications Systems (MCS) in: Fundamentals of Cellular Communications, Communication Networks Research Lab, (Fall 2000).

Patel, et al., "Analysis of a simple successive interference cancellation scheme in a DS/CDMA system," IEEE Journal on Selected Areas in Communications, vol. 12, Issue 5, Jun. 1994, pp. 796-807.

Taiwan Search Report—TW097137357—TIPO—Apr. 23, 2012.

\* cited by examiner

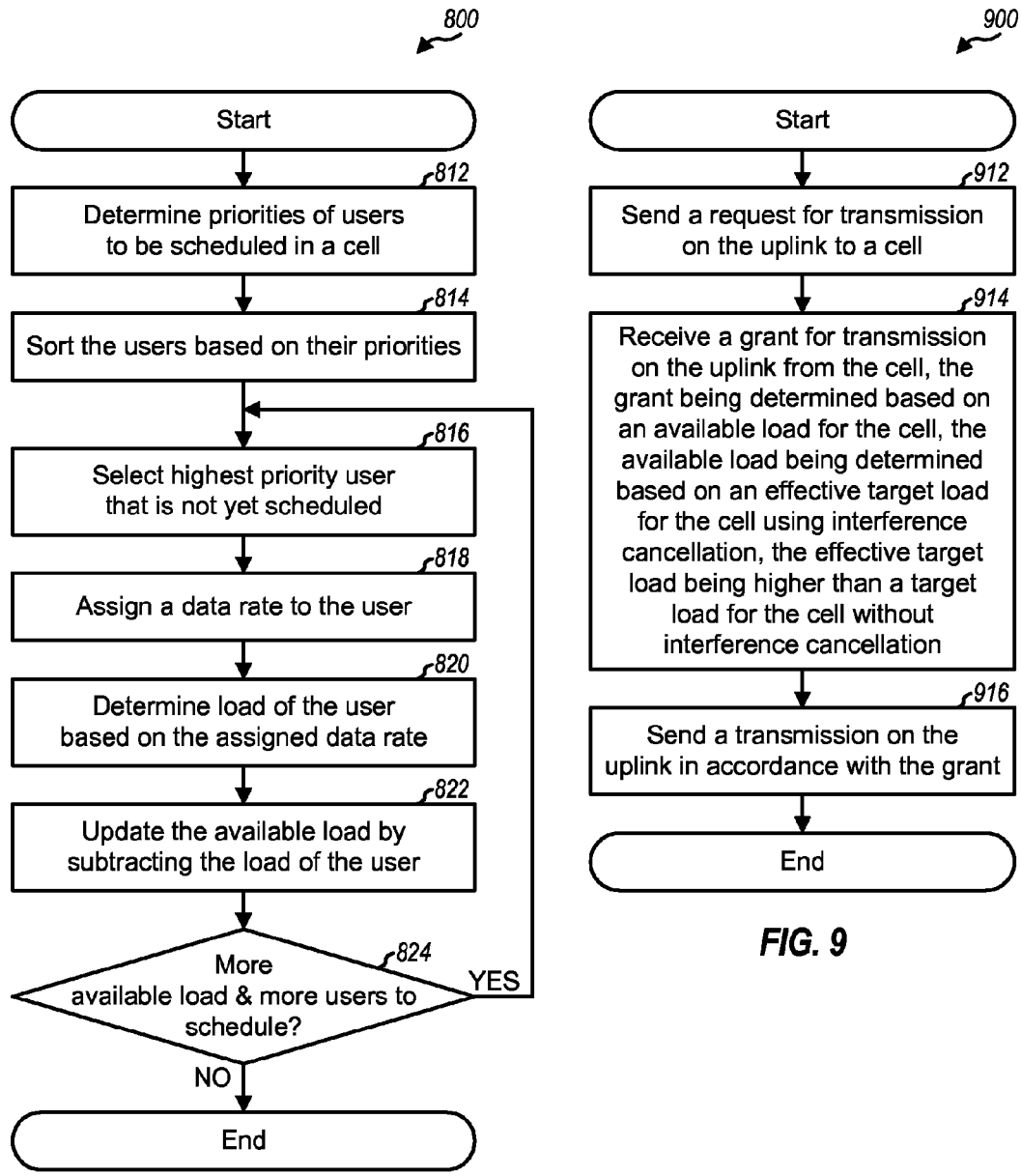

SCHEDULING BASED ON EFFECTIVE TARGET LOAD WITH INTERFERENCE CANCELLATION IN A WIRELESS COMMUNICATION SYSTEM

CLAIM OF PRIORITY UNDER 35 U.S.C. §119

The present Application for Patent claims priority to Provisional U.S. Application Ser. No. 60/975,853, filed Sep. 28, 2007, assigned to the assignee hereof, and expressly incorporated herein by reference.

BACKGROUND

I. Field

The present disclosure relates generally to communication, and more specifically to techniques for scheduling users in a wireless communication system.

II. Background

Wireless communication systems are widely deployed to provide various communication services such as voice, video, packet data, messaging, broadcast, etc. These systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

In a CDMA communication system, multiple user equipments (UEs) may currently transmit on the uplink to a Node B. The transmission from each UE acts as interference to the transmissions from other UEs at the Node B. The received signal quality of a given UE may be dependent on various factors such as the amount of transmit power used by the UE, the path loss from the UE to the Node B, the amount of interference observed by the Node B, etc. The received signal quality of the UE may be improved by increasing the transmit power of the UE. However, the higher transmit power of the UE would increase interference to other UEs, each of which may need to increase its transmit power in order to maintain the desired received signal quality for that UE.

The UEs may be intermittently active on the uplink and may transmit sporadically whenever there is data to send. The UEs may be scheduled for transmission on the uplink whenever they have data to send. The scheduling may be challenging due to interference between uplink transmissions from different UEs.

SUMMARY

Techniques for scheduling users for transmission on the uplink in a wireless communication system are described herein. A cell may perform interference cancellation for uplink transmissions in order to improve performance. The cell may estimate interference due to uplink transmissions received by the cell and may subtract the estimated interference from a received signal. The cell may observe lower effective noise and interference due to interference cancellation. The lower effective noise and interference may allow the cell to operate with a higher effective target load, which may support a higher overall throughput for the cell.

In one design, an effective target load for a cell using interference cancellation may be determined, e.g., based on a target rise-over-thermal (RoT) for the cell and an interference cancellation efficiency factor. An available load for the cell may be determined based on the effective target load, which may be higher than a target load for the cell without interference cancellation. Users in the cell may be scheduled for transmission on the uplink based on the available load.

In one design, the users may be scheduled, one user at a time, based on their priorities. A data rate may be assigned to a user based on a power headroom and a queue size of the user. The load of the user may be determined based on the assigned data rate and other pertinent information. The available load may be updated by subtracting the load of the user. Another user may be scheduled in similar manner based on the updated available load.

Various aspects and features of the disclosure are described in further detail below.

BRIEF DESCRIPTION OF THE DRAWINGS

FIG. 8 shows a process for scheduling users based on the available load.

FIG. 9 shows a process performed by a UE for uplink transmission.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.20, IEEE 802.16 (WiMAX), 802.11 (WiFi), Flash-OFDM®, etc. UTRA and E-UTRA are part of Universal Mobile Telecommunication System (UMTS). 3GPP Long Term Evolution (LTE) is an upcoming release of UMTS that uses E-UTRA. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). These various radio technologies and standards are known in the art. For clarity, certain aspects of the techniques are described below for UMTS, and UMTS terminology is used in much of the description below.

Figure 1:
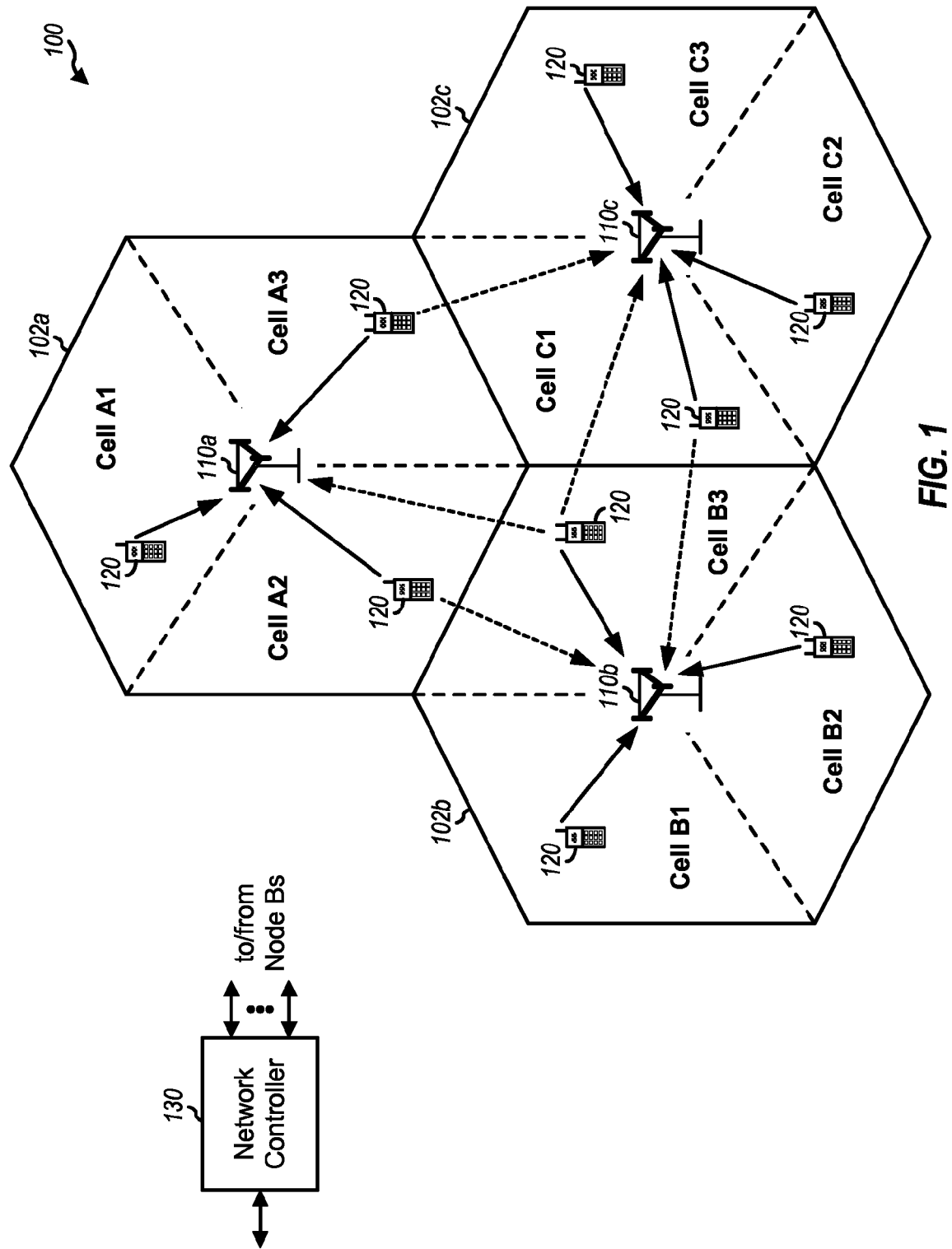
FIG. 1 shows a wireless communication system.

FIG. 1 shows a wireless communication system 100, which may be a Universal Terrestrial Radio Access Network (UTRAN) in UMTS. System 100 may include any number of Node Bs 110. A Node B may be a fixed station that communicates with the UEs and may also be referred to as an evolved Node B (eNB), a base station, an access point, etc. Each Node B 110 provides communication coverage for a particular geographic area 102 and supports communication for the UEs located within the coverage area. The coverage area of a Node B may be partitioned into multiple (e.g., three) smaller areas, and each smaller area may be served by a respective Node B subsystem. In 3GPP, the term "cell" can refer to the smallest coverage area of a Node B and/or a Node B subsystem serving this coverage area, depending on the context in which the term is used. In 3GPP2, the term "sector" can refer to the smallest coverage area of a base station and/or a base station subsystem serving this coverage area. For clarity, 3GPP concept of cell is used in the description below. In the example shown in FIG. 1, Node B 110a serves cells A1, A2 and A3, Node B 110b serves cells B1, B2 and B3, and Node B 110c serves cells C1, C2 and C3.

A network controller 130 may couple to Node Bs 110 and provide coordination and control for these Node Bs. Network controller 130 may be a single network entity or a collection of network entities.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless communication device, a handheld device, a wireless modem, a laptop computer, etc. A UE may communicate with a Node B via the downlink and uplink. The downlink (or forward link) refers to the communication link from the Node B to the UE, and the uplink (or reverse link) refers to the communication link from the UE to the Node B. For clarity, FIG. 1 shows only uplink transmissions from UEs 120 to Node Bs 110. In FIG. 1, a solid line with a single arrow indicates an uplink transmission to a serving cell, and a dashed line with a single arrow indicates an uplink transmission to a non-serving cell. The terms "UE" and "user" are used interchangeably herein.

3GPP Release 6 and later supports High-Speed Uplink Packet Access (HSUPA), which is a set of channels and procedures that enable high-speed packet data transmission on the uplink. For HSUPA, a user may send a scheduling information (SI) message containing information on queue size and power headroom for the user. This information may be translated into a maximum data rate that can be supported by the user on the uplink. A scheduler may schedule the user for transmission on the uplink and may send a grant on an E-DCH Absolute Grant Channel (E-AGCH) or an E-DCH Relative Grant Channel (E-RGCH) to the user. The user may have an active set containing a serving cell and zero or more non-serving cells. The serving cell may send (i) an absolute grant on the E-AGCH to indicate an amount of transmit power that the user may use for transmission on the uplink or (ii) a relative grant on the E-RGCH to indicate a change from the current grant, e.g., an increase or decrease of the current grant by some amount. Each non-serving cell may track the user and may only send a relative grant to decrease the current grant.

HSUPA supports hybrid automatic retransmission (HARQ) on the uplink. For HARQ, a user may send a transmission of a packet to a serving cell and may send zero or more retransmissions of the packet until an acknowledgement (ACK) is received for the packet, or the maximum number of retransmissions has been sent, or the packet is terminated for some other reason. A retransmission of a pending packet has higher priority than a transmission of a new packet in HSUPA. A pending packet is a packet that has been sent but is decoded in error.

As shown in FIG. 1, each cell may receive transmissions from users served by that cell as well as transmissions from users not served by the cell. The total interference observed at each cell is composed of (1) intra-cell interference from users within the same cell and (2) inter-cell interference from users in other cells. The inter-cell interference and intra-cell interference have a large impact on performance and may be taken into account in scheduling users, as described below.

On the uplink in system 100, the transmission from each user acts as interference to the transmissions from other users. Hence, when a new user is scheduled on the uplink, the transmission from this user increases the interference to other users. The amount of interference caused by the new user may be dependent on various factors such as the amount of transmit power used by the user, the path loss from the user to the cell, etc. To combat the increased interference, each remaining user may increase its transmit power, which may further increase interference at the cell. As more users are added, other active users may need to increase their transmit power, and the total interference at the cell may increase. At some point, no more users may be added. The system may thus be interference-limited on the uplink.

Figure 2:
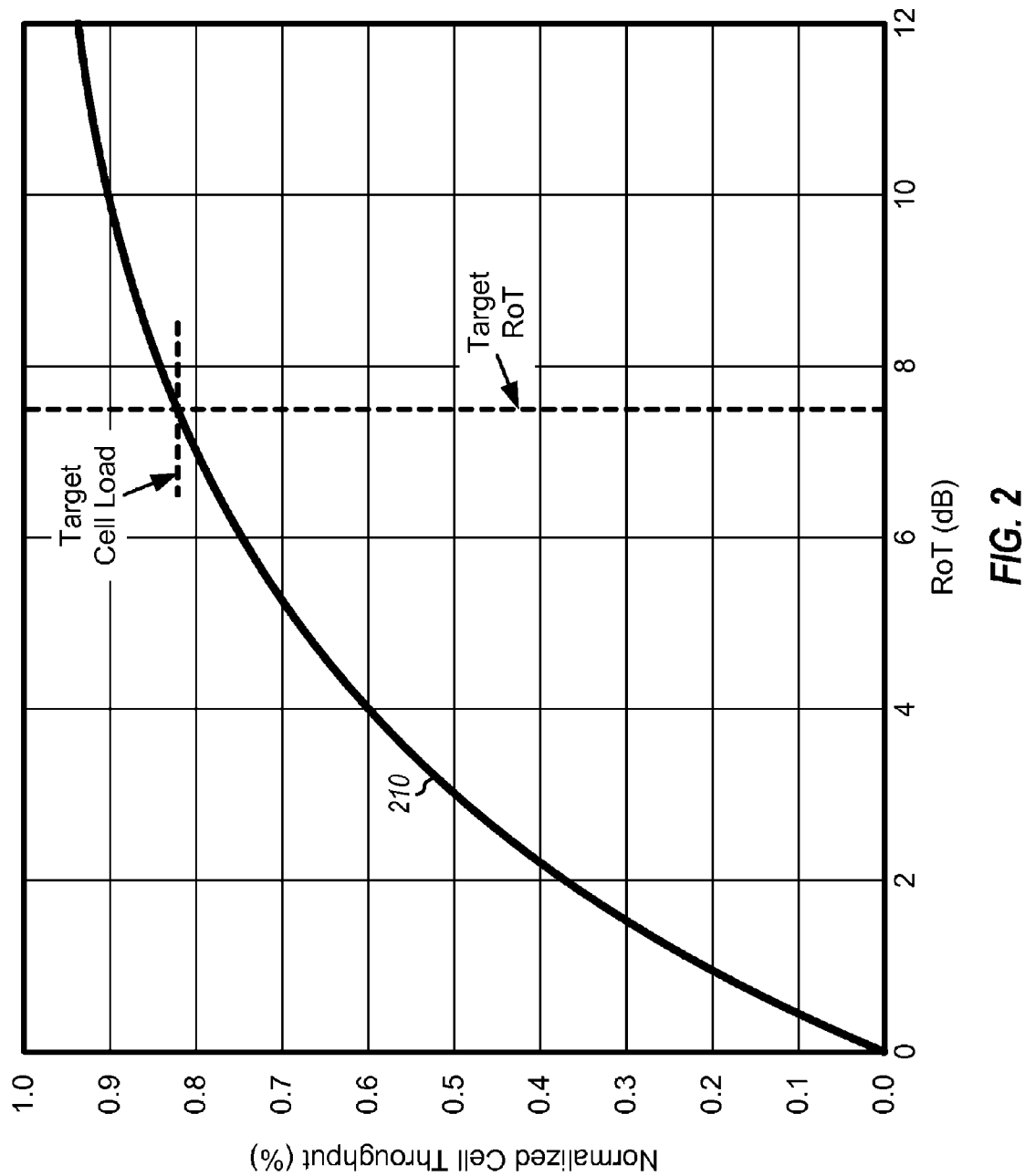
FIG. 2 shows a plot of normalized cell throughput versus RoT.

FIG. 2 shows a plot 210 of normalized cell throughput versus RoT for the uplink. RoT is a ratio of total noise and interference ($I_o$) to thermal noise ($N_o$) at a cell. Normalized cell throughput is the total throughput of all users on the uplink divided by the maximum total throughput. As shown in FIG. 2, cell throughput increases by a larger percentage at low RoT and asymptotically reaches a maximum value at high RoT.

RoT is a fundamental measure of loading on the uplink. RoT may be maintained below a certain target level in order to avoid system instability. RoT may fluctuate depending on the number of users scheduled on the uplink and the data rates of the scheduled users.

A cell may process uplink transmissions with interference cancellation in order to improve performance. In general, the cell may perform interference cancellation for pilot channels, control channels, and/or data channels sent by the users. For interference cancellation of a data channel from a user, the cell may process a received signal containing the data channel to obtain decoded data for the user. The cell may then process the decoded data in the same manner as the user to obtain a data signal sent by the user. The cell may pass the data signal through a channel estimate for the user to obtain an estimate of the interference due to the data signal from the user. The cell may then subtract the estimated interference from the received signal to obtain an interference-canceled signal. The cell may process the interference-canceled signal to recover another data channel sent by the same user or another user.

In general, the cell may attempt to cancel interference due to any signal sent on the uplink. The cell may cancel interference due to pilot, control information, and/or data in order to reduce interference in the received signal. Pilot is data that is known a priori by both a transmitter and a receiver. Control information may also be referred to as overhead information, signaling, etc. The cell may derive a channel estimate based on pilot and may cancel interference due to pilot using the channel estimate. The cell may cancel interference due to control information and/or data either before or after decoding. By canceling interference in the received signal, a higher data rate may be used for a data channel and/or more data channels may be sent.

In an aspect, users may be scheduled for transmission on the uplink by taking into account interference cancellation at a cell. The cell may perform interference cancellation and may observe a lower effective $I_0$ due to interference cancellation. The lower effective $I_0$ may allow the cell to operate with a higher effective target load, which may support a higher overall throughput for the cell.

A total-energy-per-chip-to-total-noise ratio, $(E_c/N_t)_i$, for a given user i at a given cell may be expressed as:

$$(E_c/N_t)_i = (E_{cp}/N_t)_i \cdot (1 + O2P_i + T2P_i), \quad \text{Eq (1)}$$

where $E_{cp}$ is an energy-per-chip for pilot,
$E_c$ is a total-energy-per-chip for data, overhead, and pilot,
$N_t$ is total noise and interference observed by user i,
$O2P_i$ is an overhead-to-pilot ratio for user i, and
$T2P_i$ is a traffic-to-pilot ratio for user i.

A pilot-energy-per-chip-to-total-noise ratio, $(E_{cp}/N_t)_i$, for user i may be estimated based on pilot transmitted by user i on the uplink. User i may transmit control information at a power level determined by $O2P_i$ and may transmit data at a power level determined by $T2P_i$. $O2P_i$ is the ratio of the control power level to the pilot power level, and $T2P_i$ is the ratio of the data power level to the pilot power level. The pilot power level may be adjusted via power control to achieve a desired level of performance, e.g., a target packet error rate (PER). The ratios $O2P_i$ and $T2P_i$ may be known or may be determined for user i. $(E_c/N_t)_i$ for user i may then be computed based on the estimated $(E_{cp}/N_t)_i$ and the known $O2P_i$ and $T2P_i$.

The load of user i may be expressed as:

$$L_i = \frac{(E_c)_i}{I_0} = \frac{(E_c/N_t)_i}{1 + (E_c/N_t)_i}, \quad \text{Eq (2)}$$

where $(E_c)_i$ is a total-energy-per-chip for user i and $L_i$ is the load of user i. The second equality in equation (2) may be obtained by dividing $(E_c)_i$ by $(N_t)_i$ to obtain $(E_c/N_t)_i$ in both the numerator and denominator. $(E_c/N_t)_i$ may then be estimated and used to compute $L_i$.

The total noise and interference, $I_0$, observed by the cell may be expressed as:

$$I_0 = \sum_i (E_c)_i + N_0 = (N_t)_i + (E_c)_i, \quad \text{Eq (3)}$$

where $N_0$ is the thermal noise observed by the cell, and
$(N_t)_i$ is the total noise and interference observed by user i.

An uplink transmission from user i may be processed with a rake receiver or an equalizer at the cell. For the rake receiver, one or more fingers may be assigned to user i, and each finger may process a different signal path for user i. In this case, $(E_c/N_t)_i$ may be estimated by each assigned finger, the load for each finger may be computed based on the estimated $(E_c/N_t)_i$ as shown in equation (2), and the loads for all assigned fingers may be summed to obtain the load $L_i$ of user i. For the equalizer, the load $L_i$ of user i may be computed based on a load equation defined for the equalizer.

The load of all users served by the cell, $L_{in\text{-}cell}$, may be expressed as:

$$L_{in\text{-}cell} = \sum_{i \in Cell} L_i, \quad \text{Eq (4)}$$

where Cell is a set of all users served by the cell. $L_{in\text{-}cell}$ may also be referred to as the in-cell load.

The load of all users not served by the cell but have the cell in their active sets, $L_{ns,AS}$, may be expressed as:

$$L_{ns,AS} = \sum_{\substack{i \notin Cell \\ i \in ActiveSet}} L_i, \quad \text{Eq (5)}$$

where ActiveSet is a set of all users having the cell in their active sets. $L_{ns,AS}$ may also be referred to as a non-serving active set load. A non-served user is a user that is not served by the cell but has the cell in its active set.

The cell may have direct control over the loads of the users served by that cell, e.g., via absolute and relative grants to these users. The cell may have indirect control over the loads of the non-served users, e.g., via down relative grants to these users. $L_{ns,AS}$ may be computed separately in order to determine whether to send relative grants to the non-served users.

The total load of the cell, $L_{total\_cell}$, may be expressed as:

$$L_{total\_cell} = L_{in\text{-}cell} + L_{ns,AS} + L_{out}, \quad \text{Eq (6)}$$

where $L_{out}$ is the load of users in other cells and not having the cell in their active sets. $L_{out}$ may also be referred to as the outside load.

In a first design, load-based scheduling with interference cancellation may be performed. In this design, a cell f-factor, $f_{cell}$, may be defined for the cell and may be expressed as:

$$f_{cell} = \frac{L_{ns,AS} + L_{out}}{L_{in\text{-}cell}}. \quad \text{Eq (7)}$$

The cell f-factor $f_{cell}$ may be a fixed value determined based on computer simulation, empirical measurements, etc. For example, $f_{cell}$ may be set to 0.65 or some other suitable value.

Users in the cell may be scheduled for transmission on the uplink such that the RoT of the cell is at a target level, as shown in FIG. 2. This target RoT may be converted to a target total load as follows:

$$L_{target\_total} = 1 - \frac{1}{target\_RoT} = (1 + f_{cell}) \cdot L_{target\_in\text{-}cell}, \quad \text{Eq (8)}$$

where $L_{target\_total}$ is the target total load for the cell, and
$L_{target\_in\text{-}cell}$ is a target in-cell load.

The target in-cell load may be based on the target RoT as follows:

$$L_{target\_in\text{-}cell} = \frac{\left(1 - \frac{1}{target\_RoT}\right)}{(1 + f_{cell})}. \quad \text{Eq (9)}$$

An interference cancellation (IC) efficiency factor, $\lambda$, may be defined as:

$$\lambda = \frac{\text{effective } RoT \text{ with interference cancellation}}{\text{actual } RoT}. \quad \text{Eq (10)}$$

The IC efficiency factor $\lambda$ is a ratio of effective interference with interference cancellation to actual interference at the cell. The IC efficiency factor $\lambda$ is equal to or less than one, or $\lambda \leq 1.0$, and may be estimated as described below. The use of interference cancellation may allow the cell to operate at a higher effective target RoT, which may improve overall throughput for the cell.

The interference cancellation efficiency factor may be expressed as:

$$\lambda \approx \frac{1 - L_{\mathit{eff\_target\_total}}}{1 - L_{\mathit{target\_total}}} = \frac{1 - (1 + f_{\mathit{cell}}) \cdot L_{\mathit{eff\_target\_in\text{-}cell}}}{1 - (1 + f_{\mathit{cell}}) \cdot L_{\mathit{target\_in\text{-}cell}}}, \quad \text{Eq (11)}$$

where $L_{\mathit{eff\_target\_total}}$ is an effective target total load with interference cancellation, and
$L_{\mathit{eff\_target\_in\text{-}cell}}$ is an effective target in-cell load with interference cancellation.

The effective target in-cell load may be expressed as:

$$L_{\mathit{eff\_target\_in\text{-}cell}} = L_{\mathit{target\_in\text{-}cell}} + (1-\lambda) \cdot \left( \frac{1}{1 + f_{\mathit{cell}}} - L_{\mathit{target\_in\text{-}cell}} \right). \quad \text{Eq (12)}$$

As shown in equation (12), the effective target in-cell load is equal to the target in-cell load plus a factor of $(1-\lambda)\cdot(1/(1+f_{\mathit{cell}})-L_{\mathit{target\_in\_cell}})$ due to interference cancellation. The effective target in-cell load is a dynamic value that is dependent on the IC efficiency factor $\lambda$.

The users may transmit pilot on the uplink in each slot of 0.667 milliseconds (ms). $L_{\mathit{in\text{-}cell}}$ may be computed in each slot as described above. $L_{\mathit{in\text{-}cell}}$ may be noisy and may be filtered with an infinite impulse response (IIR) filter, as follows:

$$\tilde{L}_{\mathit{in\text{-}cell}}(n) = \left(1 - \frac{1}{T_{\mathit{in\text{-}cell}}}\right) \cdot \tilde{L}_{\mathit{in\text{-}cell}}(n-1) + \left(\frac{1}{T_{\mathit{in\text{-}cell}}}\right) \cdot L_{\mathit{in\text{-}cell}}(n), \quad \text{Eq (13)}$$

where $L_{\mathit{in\text{-}cell}}(n)$ is a computed value in slot n,
$\tilde{L}_{\mathit{in\_cell}}(n)$ is a filtered value in slot n, and
$T_{\mathit{in\text{-}cell}}$ is a time constant that determines the amount of averaging.
The filtering may also be based on a finite impulse response (FIR) filter, a moving average filter, etc.

An available load for the cell, $L_{\mathit{avail\_cell}}$, may then be defined as:

$$L_{\mathit{avail\_cell}} = L_{\mathit{eff\_target\_in\text{-}cell}}. \quad \text{Eq (14)}$$

The available load may be allocated to the users in the cell, as described below.

Figure 3:
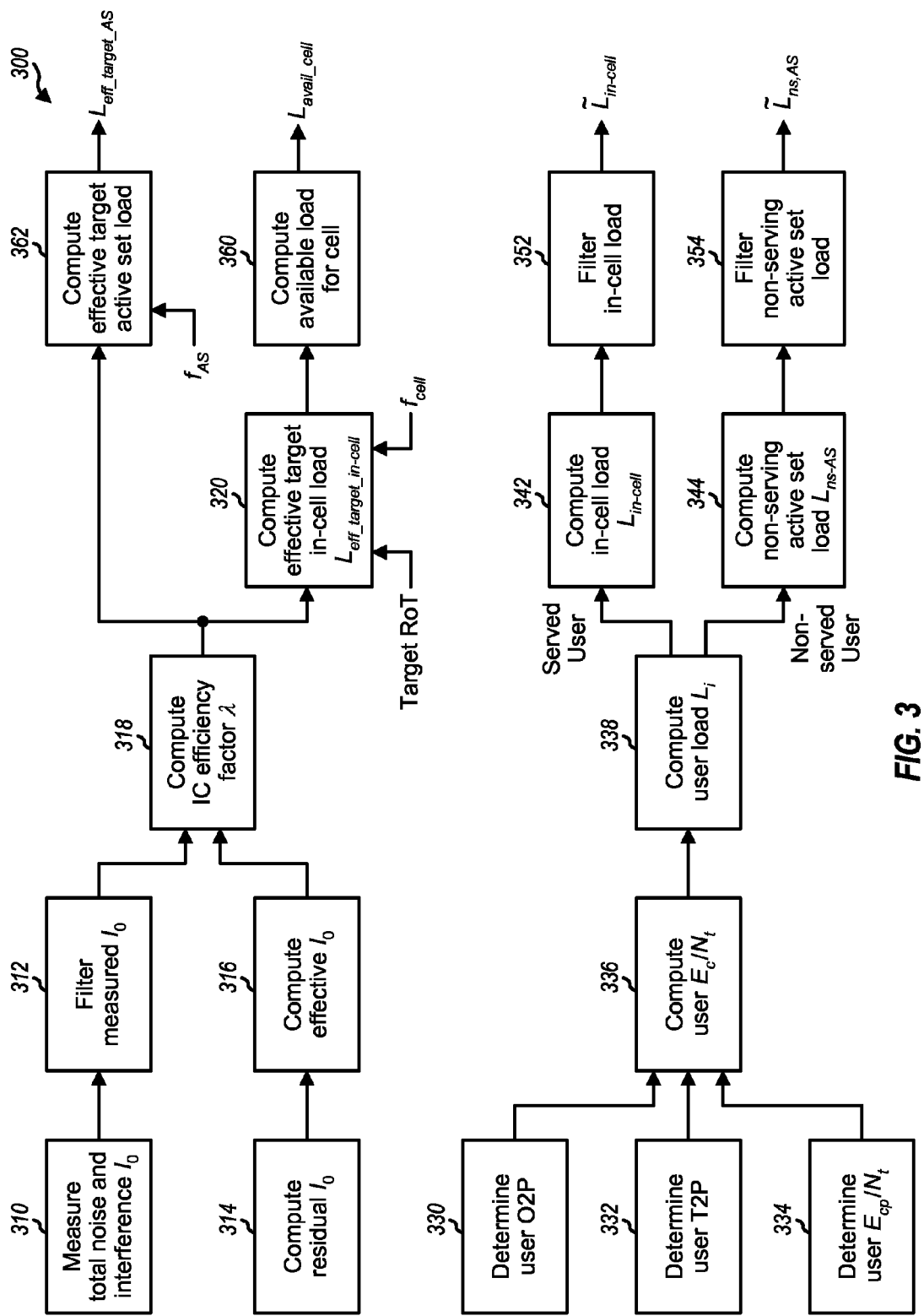
FIG. 3 shows a block diagram of a unit for computing various loads for load-based scheduling with interference cancellation.

FIG. 3 shows a block diagram of a design of a unit 300 for computing the available load $L_{\mathit{avail\_cell}}$ for load-based scheduling with interference cancellation. Total noise and interference $I_0$ at the cell may be measured in block 310 and filtered in block 312 to obtain filtered $I_0$, as described below. The filtered $I_0$ is a filtered version of the measured $I_0$ and may be a more accurate estimate of the actual $I_0$ at the cell. Residual $I_0$ may be determined in block 314 and filtered in block 316 to obtain effective $I_0$, as also described below. The residual $I_0$ is the total noise and interference remaining at the cell after performing interference cancellation. The effective $I_0$ is a filtered version of the residual $I_0$ and may be used for scheduling. The IC efficiency factor $\lambda$ may be determined in block 318 based on the effective $I_0$ and the filtered $I_0$. The effective target in-cell load $L_{\mathit{eff\_target\_in\text{-}cell}}$ may be computed in block 320 based on the target RoT, the IC efficiency factor $\lambda$, and the cell f-factor $f_{\mathit{cell}}$, as shown in equations (9) and (12).

For each user having the cell in its active set, the $O2P_i$ of the user may be determined in block 330, the $T2P_i$ of the user may be determined in block 332, and the $(E_{cp}/N_t)_i$ of the user may be determined in block 334. The $(E_c/N_t)_i$ of each user may be computed in block 336 based on the $(E_{cp}/N_t)_i$, the $O2P_i$ and the $T2P_i$, e.g., as shown in equation (1). The load of each user may be computed in block 338 based on the $(E_c/N_t)_i$, e.g., as shown in equation (2).

Each user that is served by the cell may be passed to block 342, and each non-served user having the cell in its active set but not served by the cell may be passed to block 344. The in-cell load $L_{\mathit{in\text{-}cell}}$ may be computed in block 342 by accumulating the loads of all users served by the cell, e.g., as shown in equation (4). The non-serving active set load $L_{ns,AS}$ may be computed in block 344 by accumulating the loads of all non-served users, e.g., as shown in equation (5). The in-cell load $L_{\mathit{in\text{-}cell}}$ may be filtered in block 352, e.g., as shown in equation (13). The non-serving active set load $L_{ns,AS}$ may be filtered in block 354, e.g., with an IIR filter. The available load $L_{\mathit{avail\_cell}}$ may be computed in block 360 based on the effective target in-cell load $L_{\mathit{eff\_target\_in\text{-}cell}}$, e.g., as shown in equation (14). $L_{\mathit{avail\_cell}}$, $\tilde{L}_{\mathit{in\text{-}cell}}$ and $\tilde{L}_{ns,AS}$ may be used for scheduling as described below.

In a second design, RoT-based scheduling with interference cancellation may be performed. In this design, RoT may be measured as described below. The total load of the cell, $L_{\mathit{total\_cell}}$, may then be computed based on the measured RoT, as follows:

$$L_{\mathit{total\_cell}} = \frac{I_0 - N_0}{I_0} = 1 - \frac{1}{RoT}. \quad \text{Eq (15)}$$

Users in the cell may be scheduled for transmission on the uplink such that the RoT of the cell is at a target level, as shown in FIG. 2. This target RoT may be converted to a target total load as shown in equation (8).

An effective target total load may be expressed as:

$$L_{\mathit{eff\_target\_total}} = L_{\mathit{target\_total}} + (1-\lambda) \cdot (1 - L_{\mathit{target\_total}}). \quad \text{Eq (16)}$$

As shown in equation (16), the effective target total load is equal to the target total load plus a factor of $(1-\lambda)\cdot(1-L_{\mathit{target\_total}})$ due to interference cancellation. The effective target total load is a dynamic value that is dependent on the IC efficiency factor $\lambda$.

The outside load may be computed as:

$$L_{\mathit{out}} = L_{\mathit{total\_cell}} - L_{\mathit{in\text{-}cell}} - L_{ns,AS}. \quad \text{Eq (17)}$$

The users may transmit pilot on the uplink in each slot. $L_{\mathit{in\text{-}cell}}$ and $L_{ns,AS}$ may be computed in each slot as shown in equations (4) and (5), respectively. $L_{\mathit{total\_cell}}$ may be computed in each slot based on the measured RoT, as shown in equation (15). $L_{\mathit{out}}$ may then be computed in each slot based on $L_{\mathit{total\_cell}}$, $L_{\mathit{in\text{-}cell}}$ and $L_{ns,AS}$, as shown in equation (17).

$L_{\mathit{in\text{-}cell}}$, $L_{ns,AS}$ and $L_{\mathit{out}}$ may be noisy quantities and may be filtered with IIR filters, as follows:

$$\tilde{L}_{\mathit{in\text{-}cell}}(n) = \left(1 - \frac{1}{T_{\mathit{in\text{-}cell}}}\right) \cdot \tilde{L}_{\mathit{in\text{-}cell}}(n-1) + \left(\frac{1}{T_{\mathit{in\text{-}cell}}}\right) \cdot L_{\mathit{in\text{-}cell}}(n), \quad \text{Eq (18)}$$

$$\tilde{L}_{ns,AS}(n) = \left(1 - \frac{1}{T_{ns,AS}}\right) \cdot \tilde{L}_{ns,AS}(n-1) + \left(\frac{1}{T_{ns,AS}}\right) \cdot \tilde{L}_{ns,AS}(n), \text{ and} \quad \text{Eq (19)}$$

$$\tilde{L}_{\mathit{out}}(n) = \left(1 - \frac{1}{T_{\mathit{out}}}\right) \cdot \tilde{L}_{\mathit{out}}(n-1) + \left(\frac{1}{T_{\mathit{out}}}\right) \cdot L_{\mathit{out}}(n), \quad \text{Eq (20)}$$

where $L_{\mathit{in\text{-}cell}}(n)$, $L_{ns,AS}(n)$ and $L_{\mathit{out}}(n)$ are computed values in slot n,
$\tilde{L}_{\mathit{in\text{-}cell}}(n)$, $\tilde{L}_{ns,AS}(n)$ and $\tilde{L}_{\mathit{out}}(n)$ are filtered values in slot n, and
$T_{\mathit{in\text{-}cell}}$, $T_{ns,AS}$ and $T_{\mathit{out}}$ are time constants for $L_{\mathit{in\text{-}cell}}$, $L_{ns,AS}$ and $L_{\mathit{out}}$, respectively.

An available load for the cell, $L_{avail\_cell}$, may then be expressed as:

$$L_{avail\_cell} = L_{eff\_target\_total} - \tilde{L}_{out} - \tilde{L}_{ns,AS}, \quad \text{Eq (21)}$$

where $\tilde{L}_{out}$ and $\tilde{L}_{ns,AS}$ are the current filtered values for $L_{out}$ and $L_{ns,AS}$, respectively. The available load may be allocated to the users in the cell, as described below.

Figure 4:
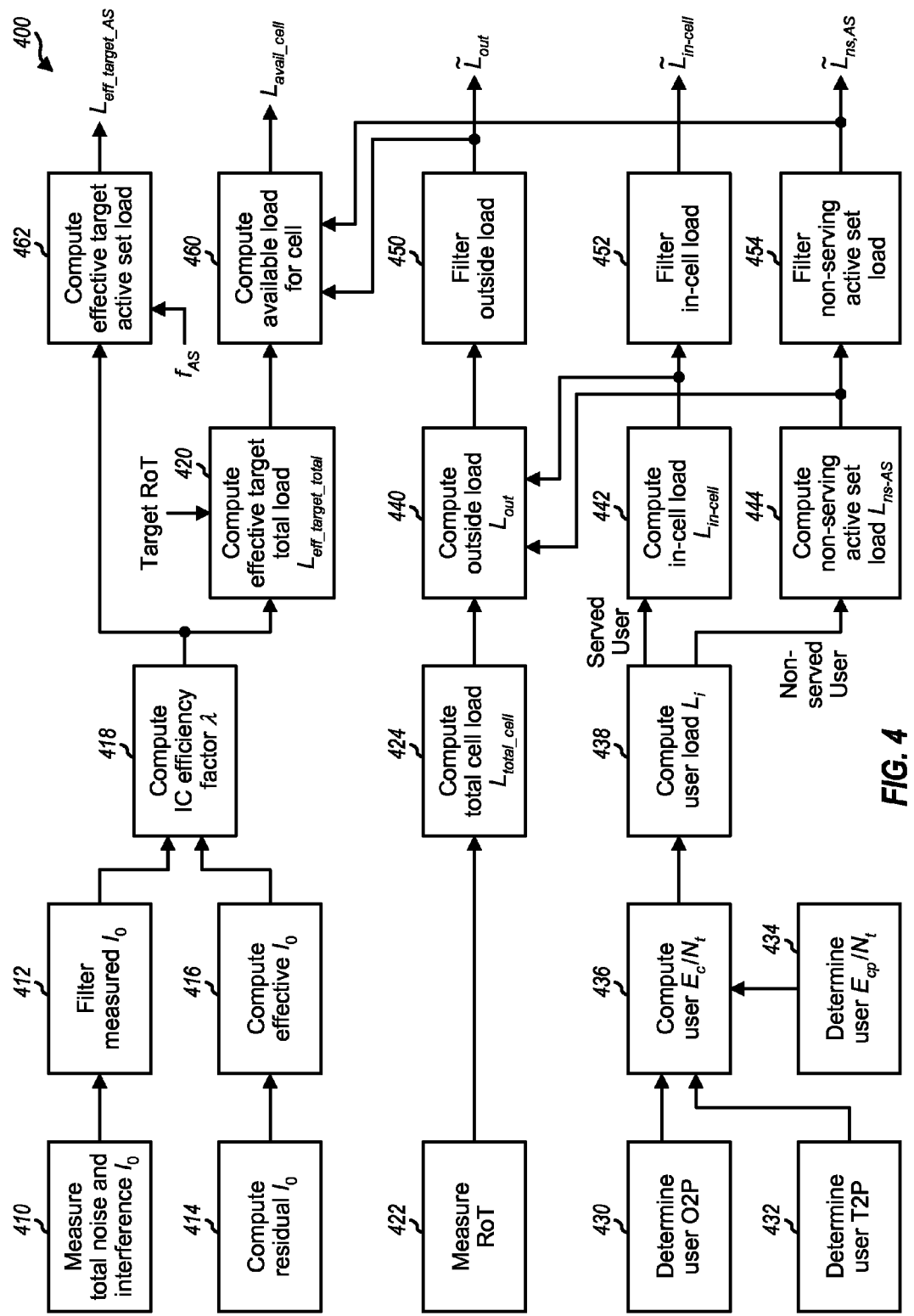
FIG. 4 shows a block diagram of a unit for computing various loads for RoT-based scheduling with interference cancellation.

FIG. 4 shows a block diagram of a design of a unit 400 for computing the available load $L_{avail\_cell}$ for RoT-based scheduling with interference cancellation. Total noise and interference $I_0$ at the cell may be measured in block 410 and filtered in block 412 to obtain filtered $I_0$. Residual $I_0$ may be determined in block 414 and filtered in block 416 to obtain effective $I_0$. The IC efficiency factor $\lambda$ may be determined in block 418 based on the effective $I_0$ and the filtered $I_0$. The effective target total load $L_{eff\_target\_total}$ may be computed in block 420 based on the target RoT and the IC efficiency factor $\lambda$, as shown in equations (8) and (16).

The RoT of the cell may be measured in block 422, as described below. The total cell load $L_{total\_cell}$ may be computed based on the measured RoT in block 424, e.g., as shown in equation (15).

For each user having the cell in its active set, the $O2P_i$ of the user may be determined in block 430, the $T2P_i$ of the user may be determined in block 432, and the $(E_{cp}/N_t)_i$ of the user may be determined in block 434. The $(E_c/N_t)_i$ of each user may be computed in block 436 based on the $(E_{cp}/N_t)_i$, the $O2P_i$ and the $T2P_i$. The load of each user may be computed in block 438 based on the $(E_c/N_t)_i$.

Each user that is served by the cell may be passed to block 442, and each non-served user having the cell in its active set but not served by the cell may be passed to block 444. The in-cell load $L_{in-cell}$ may be computed in block 442 by accumulating the loads of all users served by the cell and may be filtered in block 352, e.g., as shown in equation (18). The non-serving active set load $L_{ns,AS}$ may be computed in block 444 by accumulating the loads of all non-served users and may be filtered in block 454, e.g., as shown in equation (19).

The outside load $L_{out}$ may be computed in block 440 by subtracting the in-cell load $L_{in-cell}$ and the non-serving active set load $L_{ns,AS}$ from the total cell load $L_{total\_cell}$, e.g., as shown in equation (17). The outside load $L_{out}$ may be filtered in block 450, e.g., as shown in equation (20). The available load $L_{avail\_cell}$ may be computed in block 460 based on the effective target total load $L_{eff\_target\_total}$, the filtered outside load $\tilde{L}_{out}$, and the filtered non-serving active set load $\tilde{L}_{ns,AS}$, e.g., as shown in equation (21). $L_{avail\_cell}$, $\tilde{L}_{in-cell}$ and $\tilde{L}_{ns,AS}$ may be used for scheduling as described below.

In the design shown in equation (21), both $L_{ns,AS}$ and $L_{out}$ may be subtracted from the effective target total load $L_{eff\_target\_total}$ to obtain the available cell load $L_{avail\_cell}$. $L_{ns,AS}$ and $L_{out}$ may be considered as the total load of all users not served by the cell.

In another design, the in-cell load $L_{in-cell}$ may be determined, e.g., as shown in equation (4), but the non-serving active set load $L_{ns,AS}$ is not determined. An outside load $L'_{out}$ may then be computed as:

$$L'_{out} = L_{total\_cell} - L_{in-cell}. \quad \text{Eq (22)}$$

$L'_{out}$ includes both $L_{ns,AS}$ and $L_{out}$. $L'_{out}$ may be filtered (e.g., with an IIR filter) to obtain $\tilde{L}'_{out}$. $L_{avail\_cell}$ may then be determined based on $L_{eff\_target\_total}$ and $\tilde{L}'_{out}$ as follows:

$$L_{avail\_cell} = L_{eff\_target\_total} - \tilde{L}'_{out}. \quad \text{Eq (23)}$$

$L_{avail\_cell}$ may be allocated to the users in the cell, as described below.

For both load-based and RoT-based scheduling with interference cancellation, $I_0$ may be measured based on input samples from a receiver, as follows:

$$I_0(n) = \sum_k [I_{in}^2(n,k) + Q_{in}^2(n,k)], \quad \text{Eq (24)}$$

where $I_{in}(n,k)$ is an inphase input sample for sample period k in slot n, $Q_{in}(n,k)$ is a quadrature input sample for sample period k in slot n, and $I_0(n)$ is a measured total noise and interference for slot n.

In equation (24), the summation may be performed across all sample periods in slot n. $I_0(n)$ may also be averaged across all receive antennas. $I_0(n)$ may be filtered as follows:

$$\tilde{I}_0(n) = \left(1 - \frac{1}{T_{load}}\right) \cdot \tilde{I}_0(n-1) + \left(\frac{1}{T_{load}}\right) \cdot I_0(n), \quad \text{Eq (25)}$$

where $T_{load}$ is a time constant that determines the amount of average, and $\tilde{I}_0(n)$ is the filtered noise and interference for slot n.

An automatic gain control (AGC) loop may maintain $I_{in}^2 + Q_{in}^2$ at a constant value of $I_{0,target}$. In this case, $I_0(n)$ and $\tilde{I}_0(n)$ may both be set to $I_{0,target}$.

One or more iterations of interference cancellation may be performed on the input samples to cancel interference due to pilot, control information, and/or data. The residual $I_0$ may be computed based on the interference-canceled samples obtained after interference cancellation, as follows:

$$I_{0,res}(n) = \sum_k [I_{ic}^2(n,k) + Q_{ic}^2(n,k)], \quad \text{Eq (26)}$$

where $I_{ic}(n,k)$ is an inphase interference-canceled sample for sample period k in slot n, $Q_{in}(n,k)$ is a quadrature interference-canceled sample, and $I_{0,res}(n)$ is the residual noise and interference for slot n.

Each iteration of interference cancellation may be performed across one or more slots. $I_{0,res}(n)$ may be updated for all slots in which interference cancellation is performed. $I_{0,res}(n)$ may also be averaged across all receive antennas. $I_{0,res}(n)$ may be filtered as follows:

$$I_{0,eff}(n) = \frac{1}{N} \cdot \sum_l I_{0,res}(n-l), \quad \text{Eq (27)}$$

where N is the number of slots over which $I_{0,res}(n)$ is averaged.

N may be determined by a control channel with the worst link margin. For example, N may match the duration of a message sent on a random access channel (e.g., equal to 15 slots) or may be equal to some other suitable value.

In the design shown in equation (27), $I_{0,eff}(n)$ is obtained based on a moving average filter operating over N slots. In one design, the moving average is over N consecutive most recent slots, so that l=0, 1, ..., N−1. In another design, the moving average is over N most recent slots for a given HARQ interlace. L HARQ interlaces may be defined, and each HARQ interlace may include slots that are spaced apart by L slots. In this design, l=0, L, ..., L·(N−1). The filtering of $I_{0,res}(n)$ may also be based on an IIR filter, a FIR filter, or some other type of filter.

The IC efficiency factor λ may be computed based on $I_{0,eff}$ and $\tilde{I}_0$, as follows:

$$\lambda(n) = \frac{I_{0,eff}(n)}{\tilde{I}_0(n)}. \quad \text{Eq (28)}$$

For RoT-based scheduling, the RoT of the cell may be measured in order to compute the total cell load $L_{total\_cell}$. The RoT may be expressed as:

$$RoT = \frac{I_0}{N_0}. \quad \text{Eq (29)}$$

The total noise and interference $I_0$ may be readily measured as described above. The thermal noise $N_0$ may be measured in several manners. In one design, $N_0$ may be measured during a silence interval in which no users transmit on the uplink and may be equal to the total received power at the cell during the silence interval. In another design, the total received power in a sideband between two WCDMA carriers may be measured and used to estimate $N_0$. For example, samples prior to a pulse-shaping filter at the cell may be transformed with a fast Fourier transform (FFT) to obtain a power spectral density of both inband and sideband. $N_0$ may then be determined based on the portion of the power spectral density for the sideband. $N_0$ may also be measured in other manners. In any case, the RoT of the cell may be computed based on the measured $I_0$ and the measured $N_0$.

For both load-based and RoT-based scheduling with interference cancellation, users in the cell may be scheduled in each transmission time interval (TTI) based on the available load at the cell. A TTI may be 2 ms or 10 ms for HSUPA. The users in the cell may be scheduled in various manners. In one design, the available load may be allocated to different classes or types of transmissions in the following order:

1. Transmissions on dedicated channels assigned to the users,
2. Retransmissions of pending data with HARQ,
3. Transmissions autonomously sent by the users without requiring scheduling, and
4. Transmissions of new data.

A user may be assigned one or more dedicated channels to transmit data, control information, pilot, etc. A user may also be allowed to transmit data at any time, up to a predetermined autonomous data rate, without having to be scheduled. This autonomous data rate may be preconfigured and may be used to send delay sensitive data (e.g., voice data) and/or small amount of data. Autonomous transmission of such data may reduce scheduling overhead and latency. A user may also have a pending packet that has not been decoded correctly by the cell and may need to send a retransmission of the packet.

The load of the dedicated channels for all users served by the cell may be determined based on the $(E_{cp}/N_t)_i$ and the O2P$_i$ and T2P$_i$ of each user. Users with pending packets may be identified, and the load of retransmissions of pending packets from these users may be determined. The load of autonomous transmissions by users may also be determined. The load available for scheduling, $L_{avail\_sched}$, may then be expressed as:

$$L_{avail\_sched} = L_{avail\_cell} - L_{DPCH} - L_{retran} - L_{autonomous}, \quad \text{Eq (30)}$$

where $L_{DPCH}$ is the load of transmissions on the dedicated channels,
$L_{retran}$ is the load of retransmissions of pending packets, and
$L_{autonomous}$ is the load of autonomous transmissions.

The available load $L_{avail\_sched}$ may be allocated to users requesting transmission on the uplink based on various scheduling schemes. In one scheduling scheme, the requesting users may be prioritized based on various factors such as their supported data rates, their average throughputs, their quality of service (QoS) requirements, etc. In one design, the priority of user i may be expressed as:

$$Priority_i = \frac{R_{supported,i}}{TP_i}, \quad \text{Eq (31)}$$

where $R_{supported,i}$ is the maximum supported data rate for user i,
$TP_i$ is the average throughput for user i, and
$Priority_i$ is the priority of user i.

The users may also be prioritized in other manners and/or based on other parameters. In any case, the users may be sorted based on their priorities. The available load $L_{avail\_sched}$ may then be allocated to the sorted users, one at a time, starting with the highest priority user.

For the highest priority user to be scheduled first, the maximum supported data rate $R_{supported,i}$ for the user may be computed based on the queue size and power headroom information for the user. A data rate $R_{sched,i}$ may be selected for the user based on the maximum supported data rate $R_{supported,i}$ and the available load $L_{avail\_sched}$. The scheduled data rate is equal to or less than the maximum supported data rate and is further limited by the available load. The load of the scheduled user, $L_{sched,i}$, may be computed based on the scheduled data rate $R_{sched,i}$ and the $(E_{cp}/N_t)_i$ of the user. Different supported data rates may be associated with different $E_c/N_t$ values and hence different T2P values. The T2P value for the scheduled data rate may be determined, e.g., via a look-up table. The load of the scheduled user may then be determined based on the T2P value for the scheduled data rate and the $(E_{cp}/N_t)_i$ of the user, e.g., as shown in equations (1) and (2). The available load $L_{avail\_sched}$ may then be reduced by the load $L_{sched,i}$ of the scheduled user. The next highest priority user may be scheduled in similar manner. The process may be repeated until all requesting users have been scheduled or the available load $L_{avail\_sched}$ is zero or too small.

Figure 5:
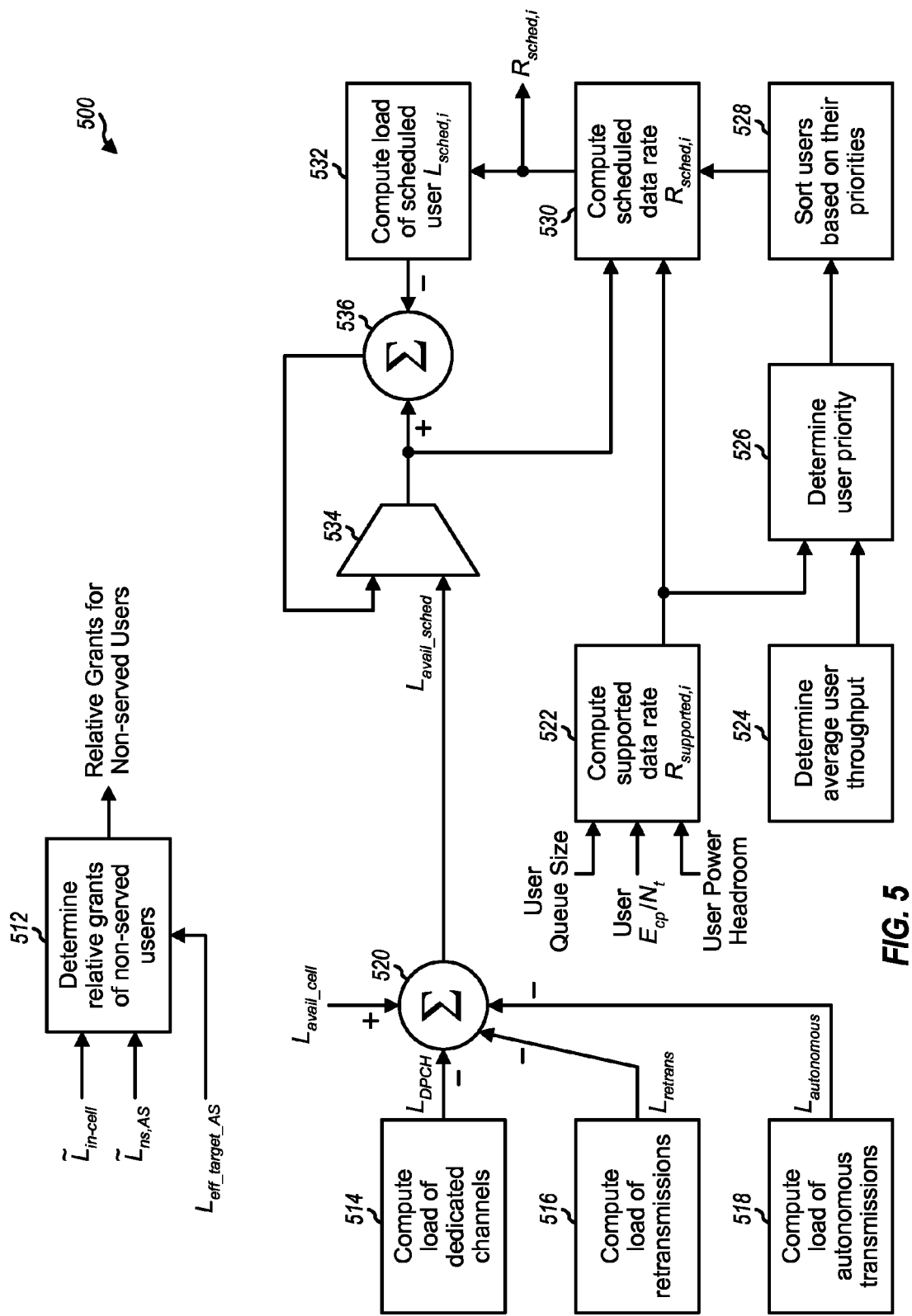
FIG. 5 shows a block diagram of a unit for scheduling users on the uplink.

FIG. 5 shows a block diagram of a design of a unit 500 for scheduling users on the uplink. The load $L_{DPCH}$ of transmissions on the dedicated channels may be computed in block 514. The load $L_{retran}$ of retransmissions of pending packets may be computed in block 516. The load $L_{autonomous}$ of autonomous transmissions may be computed in block 518. The dedicated channel load $L_{DPCH}$, the retransmission load $L_{retran}$, and the autonomous transmission load $L_{autonomous}$ may be subtracted from the available cell load $L_{avail\_cell}$ by a summer 520 to obtain the available load $L_{avail\_sched}$ for scheduling users.

For each user requesting transmission on the uplink, the maximum supported data rate $R_{supported,i}$ may be computed by block 522 based on the queue size, the power headroom, and the $(E_{cp}/N_t)_i$ for the user. The average throughput of each user may be updated in block 524 whenever that user is scheduled. The priority of each user may be determined in block 526, e.g., as shown in equation (31). The requesting users may be sorted based on their priorities in block 528.

Thereafter, for each user to be scheduled, a scheduled data rate $R_{sched,i}$ may be determined for the user by block 530 based on the maximum supported data rate for the user and the currently available load from a selector 534. The load $L_{sched,i}$ of the scheduled user may be determined by block 532 based on the scheduled data rate and other pertinent information. Selector 534 provides the available load $L_{avail\_sched}$ from summer 520 for the first user and provides the updated available load from a summer 536 for each subsequent user. Summer 536 subtracts the scheduled user load $L_{sched,i}$ from the available load $L_{avail\_sched}$ to update the available load for remaining users.

In another scheduling scheme, each requesting user (or each user scheduled in a previous TTI) may be assigned a reserved data rate that may be lower than the maximum supported data rate for that user. In one design, the reserved data rate for each user may be one data rate below the last scheduled data rate for that user. The load of the reserved data rates for all users may be computed and subtracted from the available load $L_{avail\_sched}$. The remaining available load may then be allocated to the requesting users, e.g., as described above. This scheduling scheme may ensure that the requesting users (or the previously scheduled users) are allocated at least a fraction of their maximum supported data rates.

Other scheduling schemes may also be used to allocate the available load $L_{avail\_sched}$ to the requesting users. For example, the available load may be allocated based on a round robin scheme, a proportional fairness scheme based on reported power headroom, a proportional fairness scheme based on reported power headroom and power control, a proportional fairness scheme based on reported power headroom and downlink received signal quality, etc.

The cell may decrease the data rates of non-served users having the cell in their active sets but not served by the cell. A target active set load, $L_{AS,target}$, may be defined as a target for both the in-cell load $L_{in-cell}$ and the non-serving active set load $L_{ns,AS}$. An effective target active set load, $L_{eff\_target\_AS}$, with interference cancellation may be expressed as:

$$L_{eff\_target\_AS} = L_{target\_AS} + (1-\lambda) \cdot \left( \frac{1}{1+f_{AS}} - L_{target\_AS} \right), \quad \text{Eq (32)}$$

where $f_{AS}$ is an active set f-factor, which may be set to 0.4 or some other suitable value. $L_{eff\_target\_AS}$ may be determined in block 362 in FIG. 3 or block 462 in FIG. 4 based on a predefined $L_{target\_AS}$, the IC efficiency factor $\lambda$, and the active set f-factor.

In one design, relative grants to decrease the data rates of the non-served users may be generated by block 512 in FIG. 5 if the following conditions are met:

$$\tilde{L}_{ns,AS} + \tilde{L}_{in-cell} > L_{eff\_target\_AS} \text{ AND } \frac{\tilde{L}_{ns,AS}}{\tilde{L}_{in-cell}} > K_{ns,As}. \quad \text{Eq (33)}$$

where $K_{ns,AS}$ is a ratio used to reduce the data rates of the non-served users.

In the designs shown in FIGS. 3 and 4, the non-serving active set load $L_{ns,AS}$ may be determined separately and used to send relative grants to the non-served users. The data rates of the non-served users may also be reduced based on other conditions and/or parameters.

Figure 6:
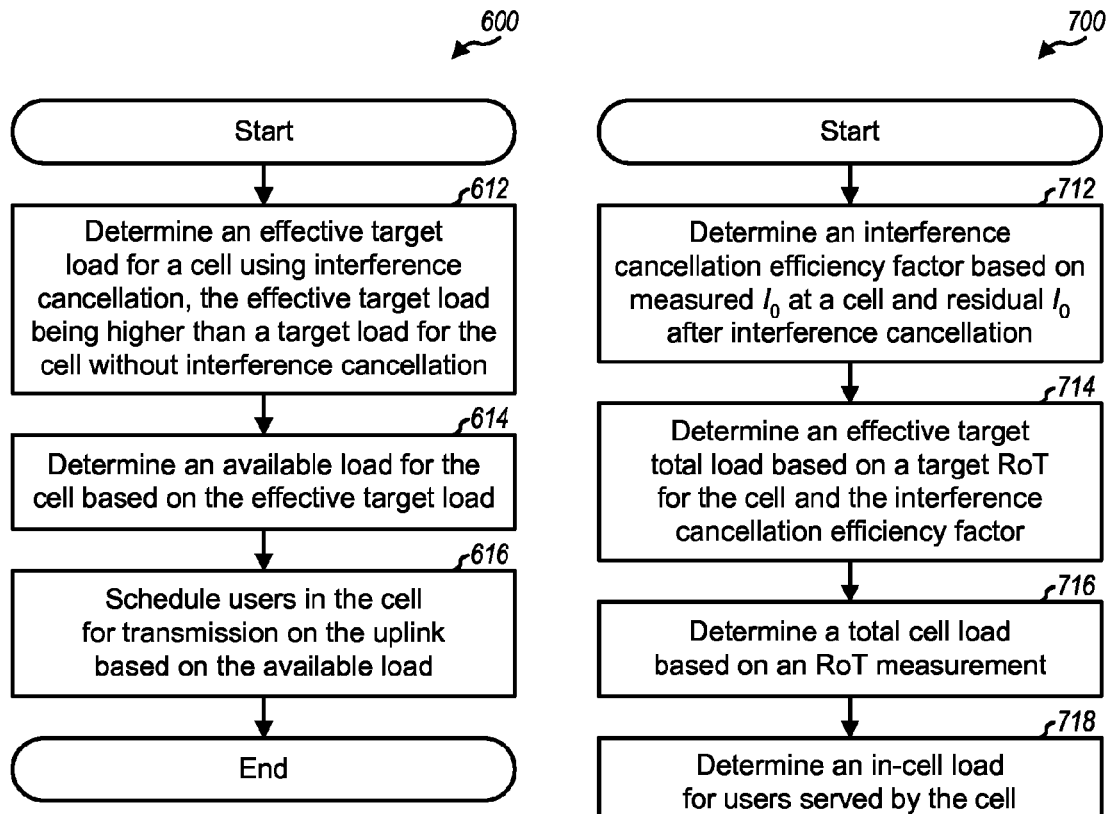
FIG. 6 shows a process for scheduling users in a cell.

FIG. 6 shows a design of a process 600 for scheduling users in a cell. Process 600 may be performed by a scheduler, which may be located at a Node B or a network controller. An effective target load for a cell using interference cancellation may be determined (block 612). The effective target load may be higher than a target load for the cell without interference cancellation and may be an effective target in-cell load $L_{eff\_target\_in-cell}$, an effective target total load $L_{eff\_target\_total}$, etc. An available load for the cell may be determined based on the effective target load (block 614). Users in the cell may be scheduled for transmission on the uplink based on the available load (block 616).

The effective target load may be determined based on a target RoT for the cell and an interference cancellation efficiency factor. In one design, for load-based scheduling, an effective target in-cell load may be determined based on the target RoT for the cell, a cell f-factor, and the interference cancellation efficiency factor, as shown in FIG. 3 in equations (9) and (12). The available load for the cell may then be determined based on the effective target in-cell load, the cell f-factor, and an in-cell load for users served by the cell, e.g., as shown in equation (14).

Figure 7:
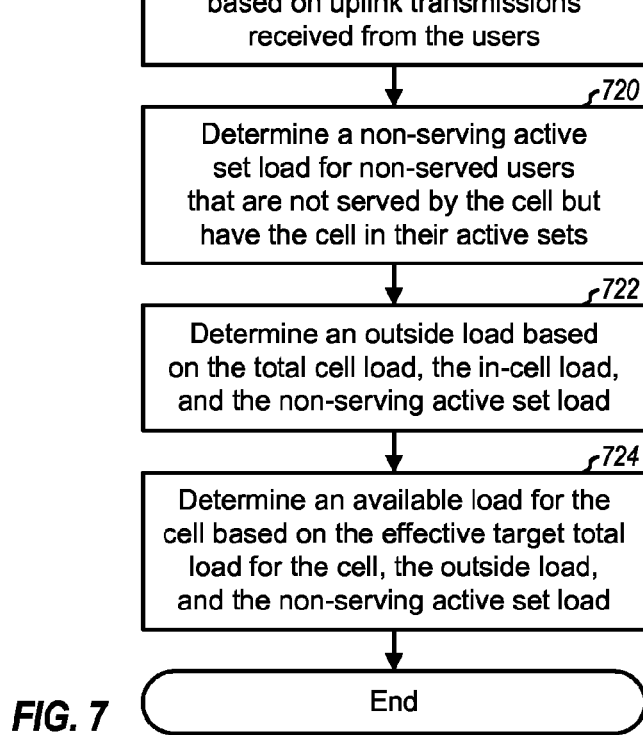
FIG. 7 shows a process for determining an available load for the cell.

FIG. 7 shows a design of a process 700 for determining an available load for a cell with RoT-based scheduling. Process 700 may be used for blocks 612 and 614 in FIG. 6. An interference cancellation efficiency factor may be determined based on (i) measured $I_0$ at the cell without interference cancellation and (ii) residual $I_0$ at the cell after interference cancellation (block 712). In one design, the measured $I_0$ may be filtered to obtain filtered $I_0$, e.g., as shown in equation (25). The residual $I_0$ may be filtered to obtain effective $I_0$, e.g., as shown in equation (27). The interference cancellation efficiency factor may then be determined based on a ratio of the effective $I_0$ to the filtered $I_0$, e.g., as shown in equation (28). An effective target total load may be determined based on a target RoT for the cell and the interference cancellation efficiency factor, e.g., as shown in equations (8) and (16) (block 714).

A total cell load may be determined based on an RoT measurement, e.g., as shown in equation (15) (block 716). An in-cell load for users served by the cell may be determined based on uplink transmissions received from these users (block 718). A non-serving active set load for non-served users that are not served by the cell but have the cell in their active sets may also be determined (block 720). An outside load may then be determined based on the total cell load, the in-cell load, and the non-serving active set load, e.g., as shown in equation (17) (block 722). An available load for the cell may be determined based on the effective target total load for the cell, the outside load, and the non-serving active set load, e.g., as shown in equation (21) (block 724).

Referring back to FIG. 6, in one design of block 616, the available load may first be allocated to transmissions on dedicated channels assigned to users served by the cell, retransmissions of pending packets from the served users, autonomous transmissions from the served users, and/or other types of transmissions before new transmissions. A load due to the dedicated channels may be determined and subtracted from the available load. A load due to the retransmissions may be determined and subtracted from the available load. A load due to the autonomous transmissions may be determined and subtracted from the available load. Reserved data rates may also be assigned to the served users. The load due to the reserved data rates may be determined and subtracted from the available load. The updated available load may then be allocated to the users in the cell.

FIG. 8 shows a design of a process 800 for scheduling users based on the available load. Process 800 may be used for block 616 in FIG. 6. Priorities of users to be scheduled in a cell may be determined, e.g., as shown in equation (31) or based on some other scheme (block 812). The users may be sorted based on their priorities (block 814). The available load may then be allocated to the sorted users, one user at a time. The highest priority user may be selected first (block 816). A data rate may be assigned to the user, e.g., based on a power headroom and a queue size of the user, the available load, etc. (block 818). A load of the user may be determined based on the assigned data rate and other pertinent information (block 820). The available load may then be updated by subtracting the load of the user (block 822). If any available load is still left and if all users have not been scheduled, as determined in block 824, then the process returns to block 816 to schedule the next highest priority user. Otherwise, the process terminates.

Relative grants may also be generated for non-served users having the cell in their active sets. In one design, an effective target active set load for the non-served users may be determined, e.g., as shown in equation (32). Relative grants for the non-served users may be generated based on the effective target active set load, e.g., as shown in equation (33).

FIG. 9 shows a design of a process 900 performed by a UE. The UE may send a request for transmission on the uplink to a cell (block 912). The UE may receive a grant for transmission on the uplink from the cell, with the grant being determined based on an available load for the cell (block 914). The available load may be determined based on an effective target load for the cell using interference cancellation. The effective target load may be higher than a target load for the cell without interference cancellation. The UE may send a transmission on the uplink in accordance with the grant (block 916).

The UE may send at least one dedicated channel to the cell. The available load may be determined based further on the load due to the dedicated channels of all users served by the cell. The UE may send a retransmission of a pending packet to the cell. The available load may be determined based further on the load due to retransmissions of all users served by the cell. The UE may autonomously send a transmission to the cell. The available load may be determined based further on the load due to autonomous transmissions of all users served by the cell.

Figure 10:
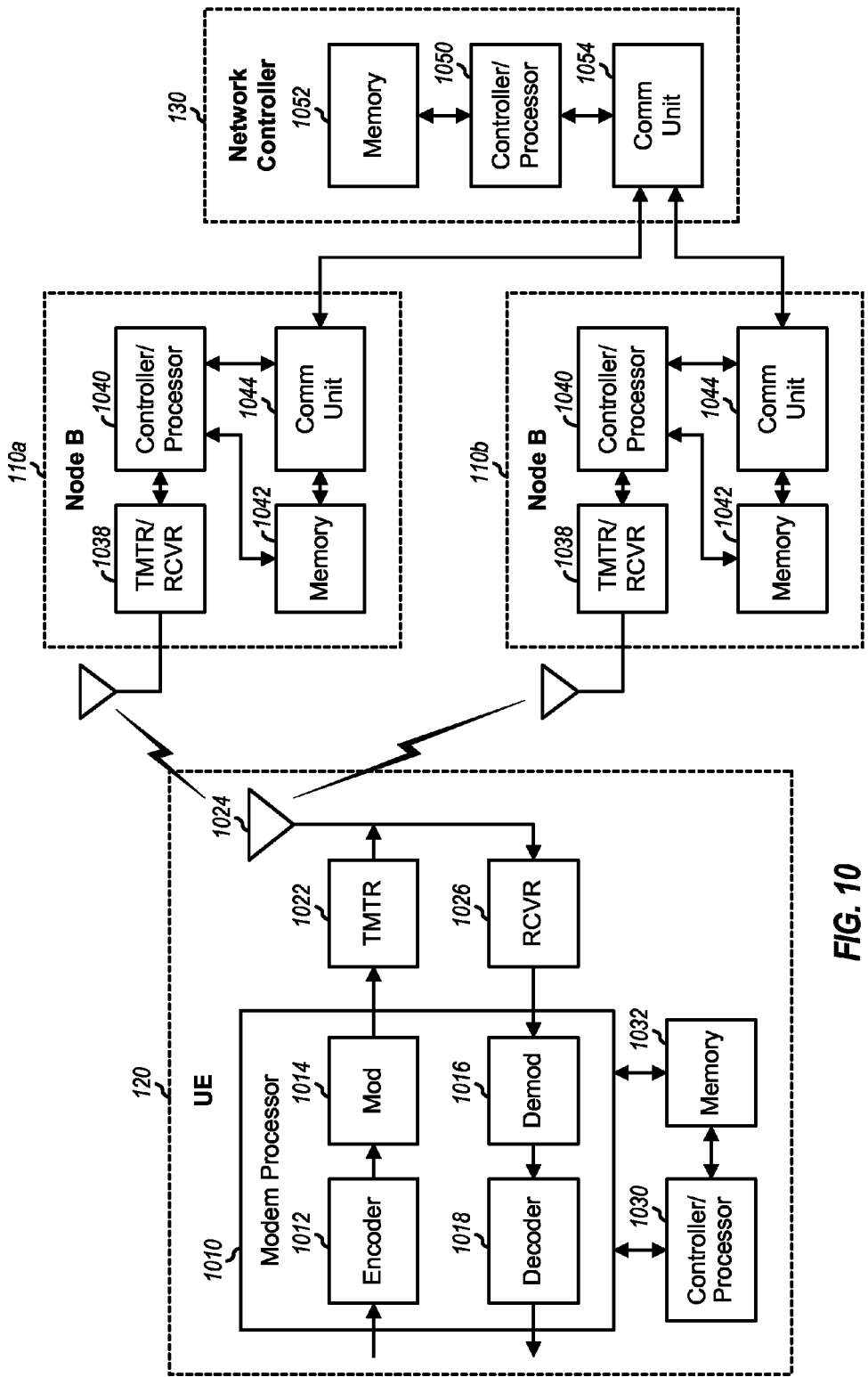
FIG. 10 shows a block diagram of the UE, two Node Bs, and a network controller.

FIG. 10 shows a block diagram of a design of UE 120, which may be one of the UEs in FIG. 1. On the uplink, an encoder 1012 may receive data and control information (e.g., scheduling information messages or scheduling requests) to be sent by UE 120 on the uplink. Encoder 1012 may process (e.g., format, encode, and interleave) the data and control information. A modulator (Mod) 1014 may further process (e.g., modulate, channelize, and scramble) the encoded data and control information and provide output samples. A transmitter (TMTR) 1022 may condition (e.g., convert to analog, filter, amplify, and frequency upconvert) the output samples and generate an uplink signal, which may be transmitted via an antenna 1024 to one or more Node Bs. On the downlink, antenna 1024 may receive downlink signals transmitted by one or more Node Bs. A receiver (RCVR) 1026 may condition (e.g., filter, amplify, frequency downconvert, and digitize) the received signal from antenna 1024 and provide input samples. A demodulator (Demod) 1016 may process (e.g., descramble, channelize, and demodulate) the input samples and provide symbol estimates. A decoder 1018 may further process (e.g., deinterleave and decode) the symbol estimates and provide decoded data and control information (e.g., absolute and relative grants) sent to UE 120. Encoder 1012, modulator 1014, demodulator 1016, and decoder 1018 may be implemented by a modem processor 1010. These units may perform processing in accordance with the radio technology (e.g., WCDMA) used by the wireless system.

A controller/processor 1030 may direct the operation of various units at UE 120. Controller/processor 1030 may implement process 900 in FIG. 9 and/or other processes for the techniques described herein. Memory 1032 may store program codes and data for UE 120.

FIG. 10 also shows a block diagram of a design of Node Bs 110a and 110b in FIG. 1. Node B 110a may support a serving cell for UE 120, and Node B 110b may support a neighbor cell or a non-serving active set cell for UE 120. At each Node B 110, a transmitter/receiver 1038 may support radio communication with UE 120 and other UEs. A controller/processor 1040 may perform various functions for communication with the UEs. For uplink transmission, the uplink signal from UE 120 may be received and conditioned by receiver 1038 and further processed by controller/processor 1040 to recover the uplink data and control information sent by the UE. For downlink transmission, data and control information may be processed by controller/processor 1040 and conditioned by transmitter 1038 to generate a downlink signal, which may be transmitted to the UEs. Memory 1042 may store program codes and data for the Node B. A communication (Comm) unit 1044 may support communication with network controller 130.

FIG. 10 also shows a block diagram of a design of network controller 130. At network controller 130, a controller/processor 1050 may perform various functions to support communication services for the UEs. Memory 1052 may store program codes and data for network controller 130. A communication unit 1054 may support communication with Node Bs 110.

The scheduling of users may be performed by Node B 110a for the serving cell, network controller 130, or some other entity. Controller/processor 1040 or 1050 may implement process 600 in FIG. 6, process 700 in FIG. 7, process 800 in FIG. 8, and/or other processes for the techniques described herein. Controller/processor 1040 or 1050 may also implement unit 300 in FIG. 3, unit 400 in FIG. 4, and/or unit 500 in FIG. 5.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   measuring, by a base station as part of a scheduling procedure, total noise and interference at a cell without interference cancellation;
   determining an effective target load for the cell using interference cancellation based on the measured total noise and interference, a target rise-over-thermal (RoT) for the cell, and an interference cancellation efficiency factor, the effective target load being higher than a target load for the cell without interference cancellation;
   determining an available load for the cell based on the effective target load; and
   scheduling users in the cell for transmission on uplink based on the available load.

2. The method of claim 1, further comprising:
   determining residual noise and interference at the cell after interference cancellation; and
   determining the interference cancellation efficiency factor based on the measured total noise and interference and the residual noise and interference.

3. The method of claim 2, wherein the determining the interference cancellation efficiency factor comprises
   filtering the measured total noise and interference to obtain filtered noise and interference,
   filtering the residual noise and interference to obtain effective noise and interference, and
   determining the interference cancellation efficiency factor based on a ratio of the effective noise and interference to the filtered noise and interference.

4. The method of claim 1, wherein the determining the available load comprises determining the available load for the cell based further on an in-cell load for users served by the cell.

5. The method of claim 4, further comprising:
   determining a load of each user served by the cell; and
   determining the in-cell load based on loads of all users served by the cell.

6. The method of claim 5, wherein the determining the load of each user served by the cell comprises
   determining a pilot-energy-per-chip-to-total-noise ratio of the user,
   determining a total-energy-per-chip-to-total-noise ratio of the user based on the pilot-energy-per-chip-to-total-noise ratio and at least one of a traffic-to-pilot ratio (T2P) and an overhead-to-pilot ratio (O2P) for the user, and
   determining the load of the user based on the total-energy-per-chip-to-total-noise ratio of the user.

7. The method of claim 1, wherein the effective target load for the cell is an effective target in-cell load for users served by the cell, wherein the determining the effective target load comprises determining the effective target in-cell load based further on the target RoT for the cell, a cell f-factor, and the interference cancellation efficiency factor, and wherein the determining the available load comprises determining the available load for the cell based on the effective target in-cell load, the cell f-factor, and an in-cell load for users served by the cell.

8. The method of claim 1, wherein the effective target load for the cell is an effective target total load for the cell, wherein the determining the effective target load comprises determining the effective target total load based further on the target RoT for the cell and the interference cancellation efficiency factor, and wherein the determining the available load comprises determining the available load based on the effective target total load and an outside load due to users in neighbor cells.

9. The method of claim 8, further comprising:
determining a total cell load based on an RoT measurement;
determining an in-cell load for users served by the cell; and
determining the outside load based on the total cell load and the in-cell load.

10. The method of claim 9, further comprising:
determining a non-serving active set load for users not served by the cell but having the cell in active sets of the users,
wherein the determining the outside load comprises determining the outside load based further on the non-serving active set load, and
wherein the determining the available load comprises determining the available load based further on the non-serving active set load.

11. The method of claim 1, further comprising:
allocating the available load to dedicated channels assigned to users served by the cell;
determining a load due to the dedicated channels; and
updating the available load by subtracting the load due to the dedicated channels.

12. The method of claim 1, further comprising:
allocating the available load to retransmissions from users served by the cell;
determining a load due to the retransmissions; and
updating the available load by subtracting the load due to the retransmissions.

13. The method of claim 1, further comprising:
allocating the available load to autonomous transmissions by users served by the cell;
determining a load due to the autonomous transmissions; and
updating the available load by subtracting the load due to the autonomous transmissions.

14. The method of claim 1, further comprising:
assigning reserved data rates to users served by the cell;
determining a load due to the reserved data rates; and
updating the available load by subtracting the load due to the reserved data rates.

15. The method of claim 1, wherein the scheduling the users in the cell comprises
determining priorities of users to be scheduled in the cell,
sorting the users to be scheduled based on the priorities, and
allocating the available load to the sorted users, one user at a time, starting with a highest priority user.

16. The method of claim 1, wherein the scheduling the users in the cell comprises
assigning a data rate to a user being scheduled,
determining a load of the user based on the assigned data rate, and
updating the available load by subtracting the load of the user.

17. The method of claim 1, further comprising:
determining an effective target active set load for users having the cell in active sets of the users, the effective target active set load resulting from use of interference cancellation at the cell and being higher than a target active set load without interference cancellation; and
generating relative grants for non-served users based on the effective target active set load, the non-served users not being served by the cell but having the cell in active sets of the non-served users.

18. The method of claim 1, wherein the scheduling the users in the cell comprises scheduling the users in the cell for transmission on the uplink with High-Speed Uplink Packet Access (HSUPA).

19. The method of claim 1, wherein the measuring total noise and interference at a cell without interference cancellation comprises measuring at least one inphase input sample and at least one quadrature input sample of a received signal.

20. The method of claim 1, wherein the measuring total noise and interference at a cell without interference cancellation is based on the following equation:

$$I_0(n) = \Sigma_k [I_{in}^2(n,k) + Q_{in}^2(n,k)],$$

where $I_{in}(n,k)$ is an inphase input sample for sample period k in slot n,
$Q_{in}(n,k)$ is a quadrature input sample for sample period k in slot n, and
$I_0(n)$ is the measured total noise and interference for slot n.

21. The method of claim 1, further comprising performing power control for the scheduled users after the scheduling.

22. An apparatus for wireless communication, comprising:
at least one processor configured to measure, by a base station as part of a scheduling procedure, total noise and interference at a cell without interference cancellation, to determine an effective target load for the cell using interference cancellation based on the measured total noise and interference, a target rise-over-thermal (RoT) for the cell, and an interference cancellation efficiency factor, the effective target load being higher than a target load for the cell without interference cancellation, to determine an available load for the cell based on the effective target load, and to schedule users in the cell for transmission on uplink based on the available load.

23. The apparatus of claim 22, wherein the at least one processor is configured to determine residual noise and interference at the cell after interference cancellation, and to determine the interference cancellation efficiency factor based on the measured total noise and interference and the residual noise and interference.

24. The apparatus of claim 22, wherein the effective target load for the cell is an effective target in-cell load for users served by the cell, and wherein the at least one processor is configured to determine the effective target in-cell load based further on the target RoT for the cell, a cell f-factor, and the interference cancellation efficiency factor, and to determine the available load for the cell based on the effective target in-cell load, the cell f-factor, and an in-cell load for users served by the cell.

25. The apparatus of claim 22, wherein the effective target load for the cell is an effective target total load for the cell, and wherein the at least one processor is configured to determine the effective target total load based further on the target RoT for the cell and the interference cancellation efficiency factor, and to determine the available load based on the effective target total load and an outside load due to users in neighbor cells.

26. An apparatus for wireless communication, comprising:
means for measuring, by a base station as part of a scheduling procedure, total noise and interference at a cell without interference cancellation;
means for determining an effective target load for the cell using interference cancellation based on the measured total noise and interference, a target rise-over-thermal (RoT) for the cell, and an interference cancellation efficiency factor, the effective target load being higher than a target load for the cell without interference cancellation;

means for determining an available load for the cell based on the effective target load; and means for scheduling users in the cell for transmission on uplink based on the available load.

27. The apparatus of claim 26, wherein the means for determining the effective target load comprises means for determining residual noise and interference at the cell after interference cancellation, and means for determining the interference cancellation efficiency factor based on the measured total noise and interference and the residual noise and interference.

28. The apparatus of claim 26, wherein the effective target load for the cell is an effective target in-cell load for users served by the cell, wherein the means for determining the effective target load comprises means for determining the effective target in-cell load based further on the target RoT for the cell, a cell f-factor, and the interference cancellation efficiency factor, and wherein the means for determining the available load comprises means for determining the available load for the cell based on the effective target in-cell load, the cell f-factor, and an in-cell load for users served by the cell.

29. The apparatus of claim 26, wherein the effective target load for the cell is an effective target total load for the cell, wherein the means for determining the effective target load comprises means for determining the effective target total load based further on the target RoT for the cell and the interference cancellation efficiency factor, and wherein the means for determining the available load comprises means for determining the available load based on the effective target total load and an outside load due to users in neighbor cells.

30. A non-transitory computer-readable medium comprising:

code for measuring, by a base station as part of a scheduling procedure, total noise and interference at a cell without interference cancellation;

code for causing at least one computer to determine an effective target load for the cell using interference cancellation based on the measured total noise and interference, a target rise-over-thermal (RoT) for the cell, and an interference cancellation efficiency factor the effective target load being higher than a target load for the cell without interference cancellation;

code for causing the at least one computer to determine an available load for the cell based on the effective target load; and code for causing the at least one computer to schedule users in the cell for transmission on uplink based on the available load.

31. A method for wireless communication, comprising:

measuring, by a base station as part of a scheduling procedure, total noise and interference at cell without interference cancellation;

determining residual noise and interference at the cell after performing interference cancellation;

determining an effective target load at a cell based on a target rise-over-thermal (RoT) for the cell and an interference cancellation efficiency factor; and scheduling users in the cell for transmission on uplink based on the measured total noise and interference and the residual noise and interference.

32. The method of claim 31, further comprising:

filtering the measured total noise and interference to obtain filtered noise and interference;

filtering the residual noise and interference to obtain effective noise and interference; and determining the interference cancellation efficiency factor based on the effective noise and interference and the filtered noise and interference, and wherein the scheduling the users comprises scheduling the users based further on the interference cancellation efficiency factor.

33. A method for wireless communication, comprising:

sending a request for transmission on uplink to a cell;

receiving a grant for transmission on the uplink from the cell, the grant being determined based on an available load for the cell, the available load being determined based on an effective target load for the cell using interference cancellation based on a measured total noise and interference, a target rise-over-thermal (RoT) for the cell, and an interference cancellation efficiency factor at a base station of the cell as part of a scheduling procedure, the effective target load being higher than a target load for the cell without interference cancellation; and sending a transmission on the uplink in accordance with the grant.

34. The method of claim 33, further comprising:

sending at least one dedicated channel to the cell, wherein the available load is determined based further on a load due to dedicated channels of users served by the cell.

35. The method of claim 33, further comprising:

sending a retransmission of a pending packet to the cell, wherein the available load is determined based further on a load due to retransmissions from users served by the cell.

36. The method of claim 33, further comprising:

autonomously sending a transmission to the cell without being scheduled, wherein the available load is determined based further on a load due to autonomous transmissions from users served by the cell.

37. A method for wireless communication, comprising:

measuring total noise and interference at a cell without interference cancellation, wherein the measuring comprises measuring at least one inphase input sample and at least one quadrature input sample of a received signal;

determining an effective target load for the cell using interference cancellation based on the measured total noise and interference, the effective target load being higher than a target load for the cell without interference cancellation;

determining an available load for the cell based on the effective target load; and scheduling users in the cell for transmission on uplink based on the available load.

* * * * *